(12) United States Patent
Coronado et al.

(10) Patent No.: US 7,471,860 B2
(45) Date of Patent: Dec. 30, 2008

(54) OPTICAL FIBER CABLE CONSTRUCTION ALLOWING RIGID ATTACHMENT TO ANOTHER STRUCTURE

(75) Inventors: Martin P. Coronado, Cypress, TX (US); Stephen L. Crow, Kingwood, TX (US); Vinay Varma, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/747,325

(22) Filed: May 11, 2007

(65) Prior Publication Data
US 2008/0279513 A1 Nov. 13, 2008

(51) Int. Cl.
*G02B 6/44* (2006.01)
*H01B 11/02* (2006.01)
(52) U.S. Cl. ............... 385/100; 385/101; 385/102; 385/109; 385/113; 385/114

(58) Field of Classification Search ............. None
See application file for complete search history.

(56) References Cited

U.S. PATENT DOCUMENTS

| 5,243,675 | A | * | 9/1993 | Kathiresan et al. | 385/109 |
| 5,970,196 | A | * | 10/1999 | Greveling et al. | 385/114 |
| 6,137,936 | A | * | 10/2000 | Fitz et al. | 385/113 |
| 6,363,192 | B1 | * | 3/2002 | Spooner | 385/101 |
| 6,591,046 | B2 | * | 7/2003 | Stottlemyer | 385/103 |
| 6,895,150 | B2 | * | 5/2005 | Stingl | 385/110 |
| 2002/0081083 | A1 | * | 6/2002 | Griffioen et al. | 385/109 |

* cited by examiner

*Primary Examiner*—Tina M Wong
(74) *Attorney, Agent, or Firm*—Cantor Colburn LLP

(57) ABSTRACT

A tubular and a jacketed cable combination includes a strip of material helically wound about itself to form a tubular structure having an inside dimension and an outside dimension, one or more optic fibers disposed within a filler material, a jacket disposed about the filler material to protect the same and an affixation between the jacket and the tubular and methods of making the combination and the cable.

20 Claims, 3 Drawing Sheets

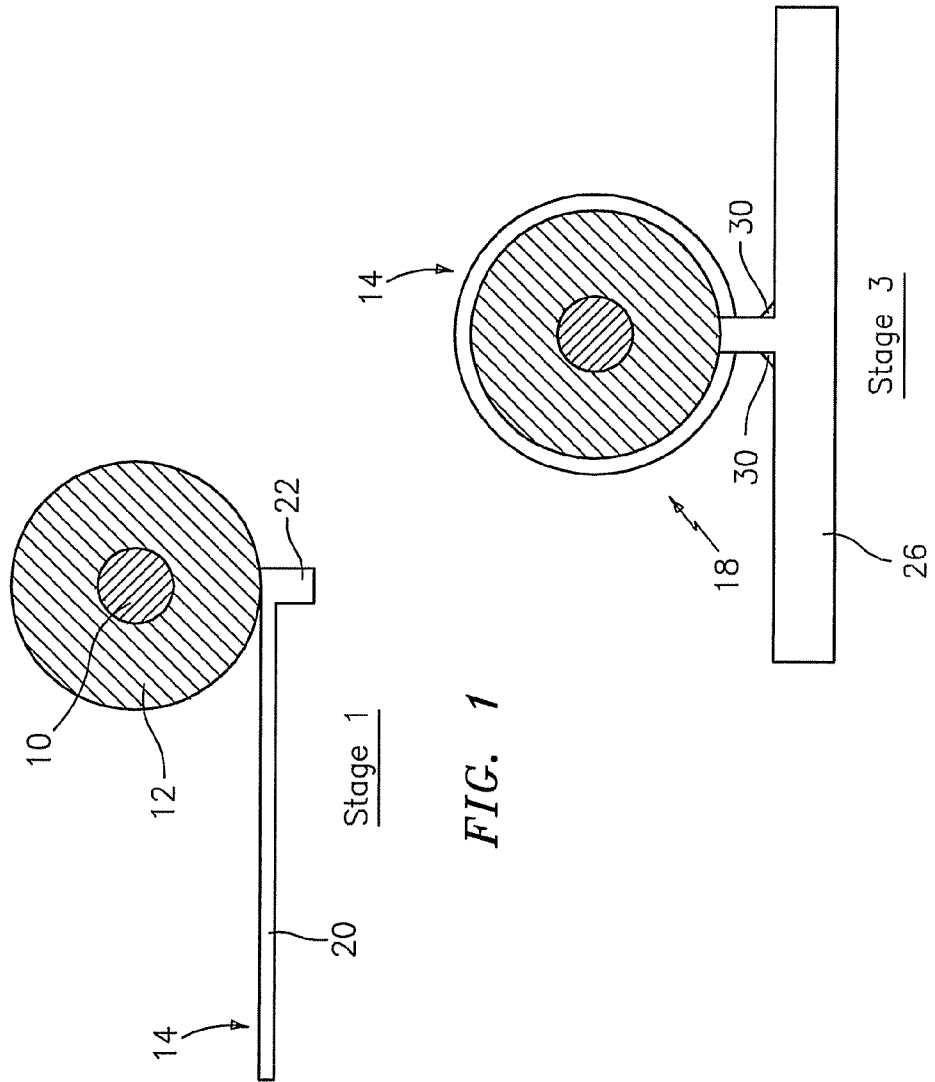
*FIG. 1*
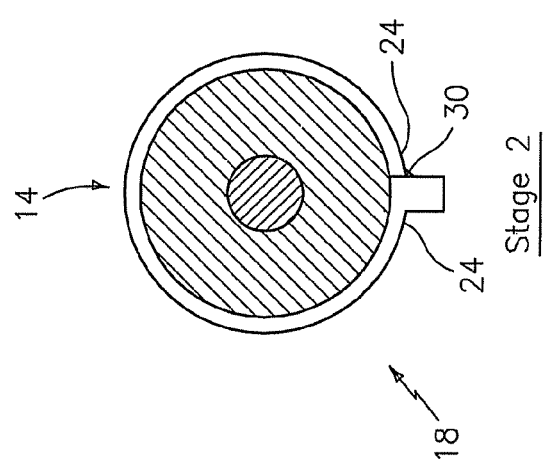
*FIG. 2*
*FIG. 3*

OPTICAL FIBER CABLE CONSTRUCTION ALLOWING RIGID ATTACHMENT TO ANOTHER STRUCTURE

BACKGROUND OF THE INVENTION

Modern hydrocarbon recovery is augmented increasingly with monitoring systems and sensory systems. Optic fibers have proven to be useful for both signal propagation and sensory capability. Actually, using the fiber downhole has, however, been a daunting task due to the downhole environment including temperature, pressure, vibration, mechanical shock and chemistry of downhole fluids, for example. In order to use an optic fiber or fiber optic cable, it has to be protected from all of these environmental hazards while at the same time being sensorily exposed to them. Such fibers also need to be retained in their designed position. There have heretofore been many attempts at methods and apparatus related to the use of optic fibers and cables downhole but each has its drawbacks or impediments. The art will therefore well receive new methods and apparatus that enhance the usability of optic fibers or cables downhole.

SUMMARY

A tubular and a jacketed cable combination includes a strip of material helically wound about itself to form a tubular structure having an inside dimension and an outside dimension, one or more optic fibers disposed within a filler material, a jacket disposed about the filler material to protect the same and an affixation between the jacket and the tubular.

A method for making a cabled tubular includes disposing a jacket material about one or more fibers insulated by a filler material, affixing the jacket material to a strip of material and winding the strip of material about itself to form a tubular, upon an inside or outside dimension of which is helically disposed, the jacket material, one or more optic fibers and filler material.

A method for mounting a cable to a tubular includes disposing a jacket around one or more fibers insulated by a filler material, welding the jacket to a strip material.

BRIEF DESCRIPTION OF THE DRAWINGS

Referring now to the drawings wherein like elements are numbered alike in the several Figures:

FIGS. 1, 2 and 3 are sequential cross-section views illustrating a first embodiment of the concept described herein;

DETAILED DESCRIPTION OF THE DRAWINGS

Figure 4:
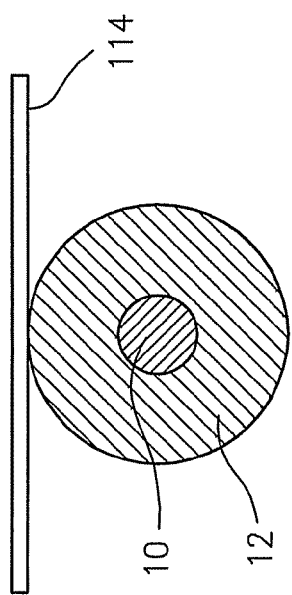
FIGS. 4, 5 and 6 are sequential cross-section views illustrating a second embodiment of the concept described herein.

Referring to FIGS. 1, 2 and 3 together, a first embodiment of the concept disclosed herein is illustrated. Centrally located is an optic fiber (one or more) 10 that is at least partially, and as illustrated fully, perimetrically (circumferentially in the illustration but not so limited) encapsulated with a filler material 12. The filler material is a material that is sufficiently viscous, or solid, to maintain the optic fiber cable 10 toward a central position thereof in order to effectively insulate the fiber from moving about within an after installed protective jacket 14, which may be of a metal material, and is so as illustrated. The filler material in one embodiment is the same as is found in the commercially available jacket protected fiber optic cable from AFL Telecommunications. In other embodiments, the material may differ providing that it maintains at least a heat protecting property with respect to the optic fiber sufficient to protect the fiber from the manufacturing properties discussed hereunder.

The jacket 14 is illustrated in two distinct mechanical configurations in FIGS. 1 and 2 to illustrate sequential stages in the preparation of a jacket wrapped and insulated fiber optic cable 18 (see FIG. 2). Metal (or other material) jacket 14 starts as a length of material having an elongated body 20 and a thickened portion, hereinunder termed as a tab 22, which may be integral with the body 20 as illustrated in FIG. 1 or may be attached thereto with a similar appearance. The attachment may be by adhesive or welding, etc. It should additionally be pointed out that the tab 22 if not integral with the body 20 may be attached thereto either before or after the jacket 14 is installed as illustrated in FIG. 2. The tab 22 also may represent a final piece of a perimetrical section of Jacket or may be an additional piece that is attached to an already perimetrically closed jacket. During manufacturing of the illustrated embodiment, a pre-constructed fiber optic (one or more) 10 and filler material 12, which may be cylindrical as shown or may be constructed in another geometric shape if desired, is placed adjacent the jacket 14 and the jacket 14 is rolled therearound to appear as in FIG. 2. The jacket is secured in the position of FIG. 2 by a single joint at one of the locations numeraled 24 or both, which securement may be a weld or adhesive such as epoxy, and in one embodiment, is a laser weld. While the weld joint does result in heating as a process, it has been discovered that the filler material sufficiently protects the optic fiber 10 from harm due to that heat.

Tab 22 provides on the finished jacketed cable 18, a convenient attachment point to affix the cable 18 to another structure such as an outer tube material 26, which may be a screen material. This may be accomplished by, in one embodiment, welding at one or both sites marked with numeral 30. Tab 22 functions to protect the one or more optic fibers 10 and filler material 12 by further spacing it physically from the heat source and to provide a convenient site for welding with relatively easier access than to place the body 20 of the jacket 14 directly in contact with the tube material 26.

Figure 5:
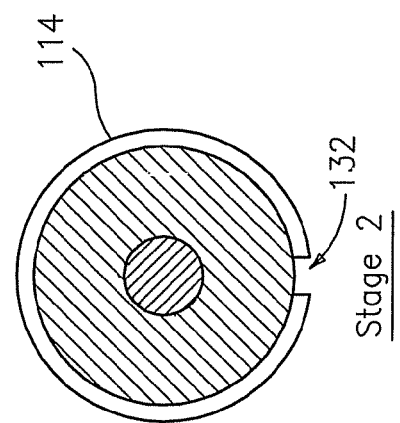
Figure 6:
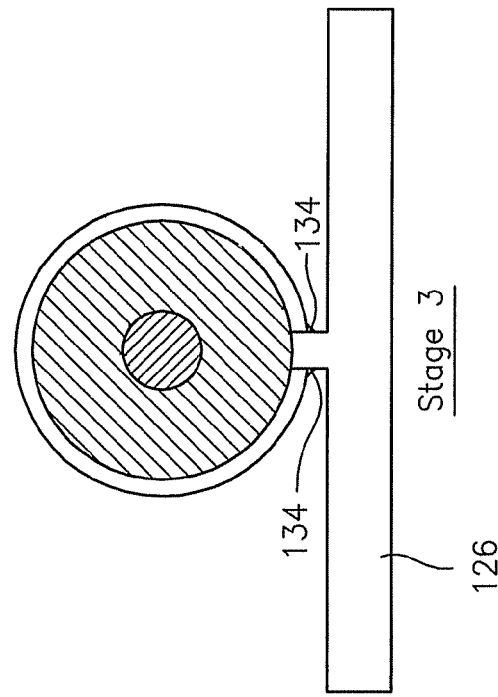

Referring to FIGS. 4, 5 and 6, a second embodiment is illustrated. In this embodiment, the optic fiber cable 10 and the filler material 12 are identical to the foregoing embodiment while the jacket configuration is distinct. Jacket 114 in this embodiment does not include the integral tab 22 but rather when rolled about the cable 10 and the filler material 12, leaves a gap 132. As will be appreciated by one of ordinary skill in the art, creating a gap 132 of a desired size requires only that one determine a circumferential length (or other shape perimetrical length) and select a jacket material 114 having a length shorter than the circumferential length or perimetrical length by the width of the tab 122 to be inserted therein.

In this embodiment, tab 122 extends from an outer tube material 126 and is affixed to jacket 114. The tab 122 may be integral to the tube material 126 as illustrated or may be after affixed thereto by adhesive or welding, etc. The appearance of the tab if not integral will be substantially the same. In either case, the tube material 126 will be provided with a tab 122 that is usable for mounting the jacketed cable. Affixation, as in the previous embodiment, can be by way of welding including laser welding or can be by other attachment method such as an adhesive method and in one embodiment by an epoxy adhesive. The attachment site(s) are indicated at 134. It is to be understood that one or both sites 134 can be used as desired.

As in the previous embodiment, if a heat dependent process issued for affixation, the filler material 12 and spacing from cable 10 is sufficient to protect cable 10 from damage due to that heat.

Figure 8:
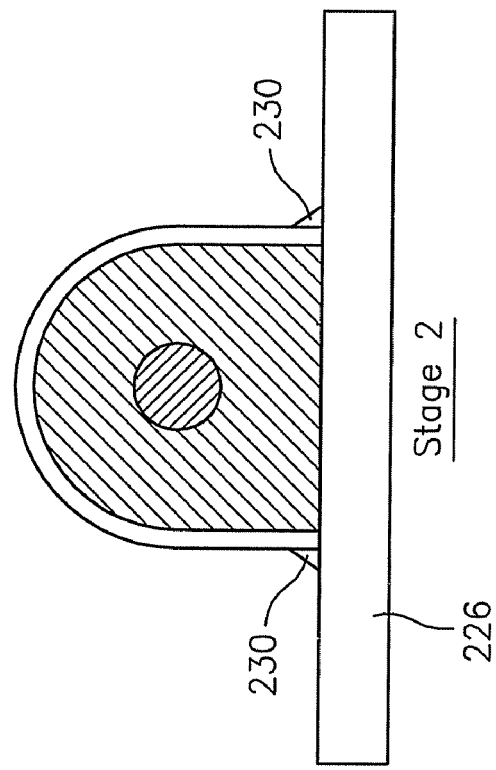
FIGS. 7 and 8 are sequential cross-section views illustrating a third embodiment of the concept described herein.
Figure 7:
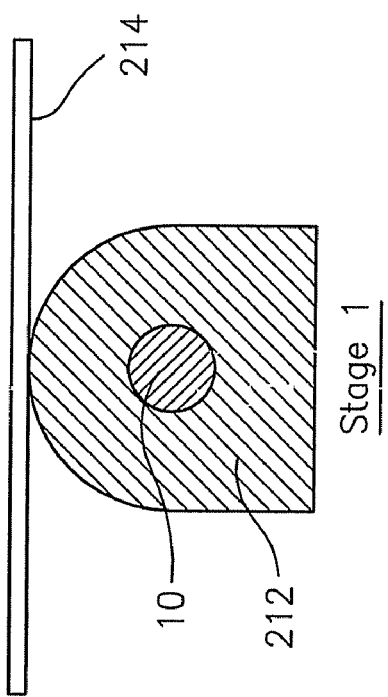

In a third embodiment, referring to FIGS. 7 and 8, the fiber optic 10 is the same but the filler material, while being of the same composition, is configured differently as illustrated. The filler material in this embodiment is therefore designated 212. A jacket material 214 is in appearance very similar to that of FIGS. 4, 5 and 6 and whose length is dependant upon what length is necessary to extend over the U-shaped configuration of the filler material 212. The only requirement with regard to length is that respective ends of jacket material 214 when formed around filler material 212, are in close enough proximity to an outer tube material 226, which is identical to material 26, to be affixed thereto at least one of the areas numeraled 230. As in previous embodiments, jacket 214 is affixable to outer screen material 226 by an adhesive such as epoxy or by welding or other affixation means. In one embodiment, the affixation is by laser welding. It is to be appreciated that the concept illustrated and disclosed in conjunction with FIGS. 7 and 8 is for the tube to a part of the confining surface of the jacket. In other words, the jacket itself does not entirely surround the filler material but rather leaves a gap of some dimension and shape. The tube material then is used to close the gap.

Each of the embodiments specifically addressed above are usable with any convenient configuration of outer screen material. One example of a configuration of outer tube material that is useful is a strip of material along which the jacketed cable is longitudinally mounted. Such strip can then be helically wound about itself to create a tubular structure. One of ordinary skill in the art is familiar with the process of constructing a tubular from a wound strip such that detailed disclosure of the process is not required. In conjunction with the embodiments hereof, however, the tubular created by the helical process is transformed from a mere tubular to one that is pre-instrumented with an optic fiber cable because the tubular is formed through a helical winding of the strip material and because the jacketed optic fiber cable is disposed along the length thereof. The jacketed optic fiber cable, then, becomes helically disposed at an inside dimension of the resulting tubular or an outside dimension of the result of tubular depending upon which way the strip is wound into the tubular form (there are only two, the cable being on the inside or the cable being on the outside).

The concept hereof yields a jacketed optic fiber cable pre-installed on a tube material so that the cable (and by definition sensing device and/or signal transmission device) is pre-mounted at the resulting tubular.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A tubular and a jacketed cable combination for a hydrocarbon wellbore comprising:
   a single strip of material helically wound about itself to form a tubular structure for installation in the wellbore having an inside dimension and an outside dimension;
   one or more optic fibers disposed within a filler material;
   a jacket disposed about the filler material to protect the same; and
   an affixation between the jacket and the tubular.

2. The tubular and jacketed cable as claimed in claim 1 wherein the affixation is a weld.

3. The tubular and jacketed cable as claimed in claim 1 wherein the affixation is a laser weld.

4. The tubular and jacketed cable as claimed in claim 1 wherein the jacket, filler material and one or more optic fibers are affixed directly to the inside dimension of the tubular.

5. The tubular and jacketed cable as claimed in claim 1 wherein the jacket, filler material and one or more optic fibers are affixed directly to the outside dimension of the tubular.

6. The tubular and jacketed cable as claimed in claim 4 wherein the affixation is by laser welding.

7. The tubular and jacketed cable as claimed in claim 5 wherein the affixation is by laser welding.

8. The tubular and jacketed cable as claimed in claim 1 wherein the jacket includes a tab extending radially from the jacket.

9. The tubular and jacketed cable as claimed in claim 8 wherein the tab is welded to the strip.

10. The tubular and jacketed cable as claimed in claim 1 wherein the strip includes a tab.

11. The tubular and jacketed cable as claimed in claim 10 wherein the tab is welded to the jacket.

12. A method for making a cabled tubular comprising:
    disposing a jacket material about one or more fibers insulated by a filler material;
    affixing the jacket material to a single strip of material; and
    winding the strip of material about itself to form a tubular, for installation in a wellbore, upon an inside or outside dimension of which is helically disposed, the jacket material, one or more optic fibers and filler material.

13. The method for making a cabled tubular as claimed in claim 12 wherein the affixing is welding.

14. The method for making a cabled tubular as claimed in claim 12 wherein the affixing is directly affixing the jacket material to the strip.

15. The method for making a cabled tubular as claimed in claim 12 wherein the affixing is indirectly affixing the jacket material to the strip.

16. The method for making a cabled tubular as claimed in claim 15 wherein the affixing is through a tab.

17. A method for mounting a cable to a tubular for installation in a wellbore comprising:
    disposing a jacket around one or more fibers insulated by a filler material; and
    welding the jacket to a strip material having an aspect ratio greater than one and where the jacket is welded to a surface corresponding to a numerator of the aspect ratio.

18. The method for mounting a cable to a tubular as claimed in claim 17 wherein the laser welding is between a tab on the jacket and the strip.

19. The method for mounting a cable to a tubular as claimed in claim 17 wherein the laser welding is between a tab on the strip and a gap in the jacket.

20. The method for mounting a cable to a tubular as claimed in claim 17 wherein the laser welding is directly between the jacket and the strip, the jacket confining a portion of the filler material and the strip confining the remaining portion of the filler material.

* * * * *